United States Patent Office 2,723,982
Patented Nov. 15, 1955

2,723,982
PRODUCTION OF THENOYLTRIFLUORO-ACETONE

Ted R. Norton, Concord, and Merritt W. Martin, Arcadia, Calif., assignors to The Dow Chemical Company, Midland, Mich., a corporation of Delaware No Drawing. Application November 25, 1949,
Serial No. 129,514

16 Claims. (Cl. 260—332.3)

This invention pertains to an improved method of making thenoyltrifluoroacetone, i. e. 2-thenoylmethyl trifluoromethyl ketone, having the formula:

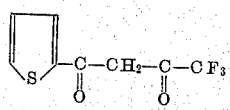

Reid and Calvin, in MDDC–1405(BC–75) of August 13, 1947, disclose the preparation of thenoyltrifluoroacetone by a method involving the following reactions:

(1)
$$CF_3CO_2C_2H_5 + NaOCH_3 \longrightarrow CF_3C\underset{OCH_3}{\overset{ONa}{\diagup \diagdown}}OC_2H_5$$

ethyl trifluoroacetate     sodium ethyl-methyl-ortho-trifluoroacetate (2)
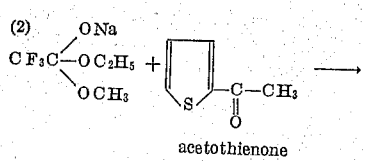

acetothienone

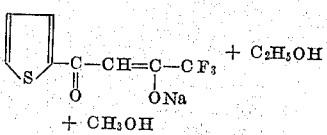

(3)
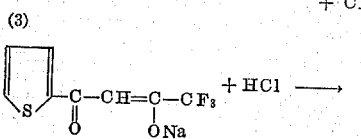

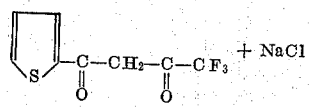

They carried the first two of these reactions out in diethyl ether as a medium, using the reactants in equimolecular proportions. After completing the second reaction, the mixture was acidified with aqueous hydrochloric acid while maintaining it at temperatures between 25° and 35° C. by external cooling. The organic layer of the acidified mixture was separated and fractionally distilled to recover the thenoyltrifluoroacetone product in an 80 per cent yield.

It has been observed that the crude reaction product from the above method comprises a considerable amount of the acetothienone starting compound. Acetothienone boils at 95–96° C./13 mm. and thenoyltrifluoroacetone at 113° C./13 mm. and the two compounds tend to distill together. Hence, purification of the thenoyltrifluoroacetone by fractional distillation, though possible, is difficult. We have found that the proportion of acetothienone occurring in the product may be reduced and the yield of thenoyltrifluoroacetone improved, by employing less than the stoichiometric proportion of acetothienone in the second of the above reactions so as to obtain nearly complete consumption of the same.

However, even when employing a molecular excess of the sodium ethyl-methyl-ortho-trifluoroacetate, relative to the acetothienone, the crude product is usually contaminated with acetothienone, purification of the thenoyltrifluoroacetone is difficult, and the yield far short of quantitative, e. g. in the order of from 80 to 90 per cent. We have found that the acetothienone occurring in such crude product is not due to incomplete consumption of the acetothienone starting material, but instead that the product, thenoyltrifluoroacetone or a salt thereof, is readily hydrolyzed at pH values of from 8 to 9, or thereabout, to regenerate acetothienone and that a considerable portion of the product is thus destroyed with regeneration of acetothienone under the acidification conditions heretofore employed for liberation of free thenoyltrifluoroacetone from its sodium salt. Such hydrolysis of the product to regenerate acetothienone also results in formation of trifluoroacetic acid, or a salt thereof, and apparently occurs in accordance with the equation:

(4)
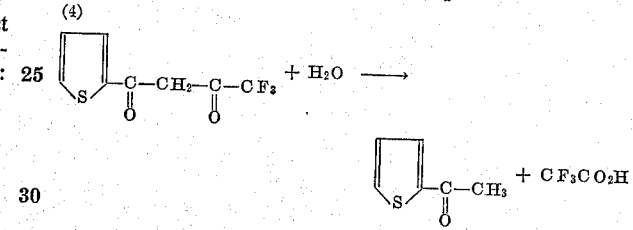

Peculiarly, such hydrolysis of thenoyltrifluoroacetone occurs rapidly and to a considerable extent only at pH values of from 8 to 9, or thereabout. At lower or higher pH values, thenoyltrifluoroacetone or a salt thereof, respectively, are relatively stable against hydrolysis.

We have found that such hydrolysis of thenoyltrifluoroacetone and regeneration of the difficulty separable acetothienone may be avoided, or at least curtailed greatly either by neutralizing or acidifying the reacted mixture with an aqueous acid at temperatures below 15° C., or preferably by adding acid under substantially anhydrous conditions to liberate thenoyltrifluoroacetone from the salt thereof without occurrence of a hydrolysis reaction.

For purpose of clarity, the foregoing discussion of the relationship between this invention and the previously known method of making thenoyltrifluoroacetone has been limited to the particular starting materials heretofore used for the purpose. However, it is not necessary that the compound which is reacted with acetothienone to form a salt of thenoyltrifluoroacetone be sodium ethyl-methyl-ortho-trifluoroacetate. Instead, any alkali metal salt of an ortho-trifluoroacetate may be used for the purpose. The ortho-trifluoroacetates have a general formula:

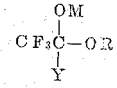

wherein M represents an alklai metal, R represents an alkyl radical, and Y is a monovalent substituent such as hydrogen, an alkoxy radical, or an amino group. Examples of such ortho-trifluoroacetates are the products resulting from the reaction of a sodium alcoholate, a potassium alcoholate, or a lithium alcoholate with any alkyl ester of trifluoroacetic acid; the products resulting from the reaction of sodamide with methyl trifluoroacetate, ethyl trifluoroacetate, propyl trifluoroacetate, or other alkyl trifluoroacetates; and the products resulting from the reaction of sodium hydride with methyl trifluoroacetate, ethyl trifluoroacetate, propyl trifluoroacetate, or butyl trifluoroacetate, etc. Specific examples are sodium dimethyl-ortho-trifluoroacetate, potassium methyl-ethylortho-trifluoroacetate, sodium diethyl-ortho-trifluoroacetate, potassium diethyl-ortho-trifluoroacetate, and sodium ethyl-butyl-ortho-trifluoroacetate, etc. Although alkali metal salts of any of the ortho derivatives of trifluoroacetic acid may be used in the process, sodium salts are preferred. In practice, we usually employ a sodium dialkyl-ortho-trifluoroacetate, and preferably sodium methyl-ethyl-ortho-trifluoroacetate, as the agent to be reacted with acetothienone to form a salt of thenoyltrifluoroacetone.

The invention will be particularly described with reference to the employment of sodium ethyl-methyl-trifluoroacetate as a reactant, it being understood that any other alkali metal salt of an ortho-trifluoroacetate may be used instead to obtain the advantages of the invention.

Methods of making salts of ortho-compounds, such as those mentioned above, are known. For instance, sodium ethyl-methyl-ortho-trifluoroacetate may be prepared by admixing ethyl trifluoroacetate with its molecular equivalent or more of sodium methylate in the presence of an inert organic liquid which is a mutual solvent for the reactants. The sodium methylate may be added in pure powdered form, or as an alcoholic solution such as that formed by reacting sodium with methanol. As the medium for the reaction between the sodium methylate and ethyl trifluoroacetate, benzene is preferred, but other aromatic or aliphatic liquids such as toluene, xylene, ethylbenzene, chlorobenzene, diethyl ether, pentane, or hexane, etc., can be used. Benzene is advantageously employed, since it is a good solvent for the sodium ethyl-methyl-ortho-trifluoroacetate and is a convenient medium for use in subsequent steps of the process. The reaction to form sodium ethyl-methyl-ortho-trifluoroacetate occurs rapidly at room temperature, but may be accomplished at lower or higher temperatures.

A salt of thenoyltrifluoroacetone is formed by reacting an alkali metal salt of one of the aforementioned ortho-trifluoroacetates, advantageously sodium ethyl-methyl-ortho-trifluoroacetate, with less than its molecular equivalent of acetothienone in the presence of an organic solvent which preferably is present in amount sufficient to dissolve the reactants. The ortho-trifluoroacetate salt need be in only slight molecular excess over the acetothienone. Employment of 1.03 mols of the ortho-trifluoroacetate salt per mol of acetothienone is satisfactory, but an even smaller or a greater excess of said salt can be used. In general, we employ from 1.005 to 1.5, preferably from 1.01 to 1.1 molecular equivalents of the ortho-trifluoroacetate salt per mol of the acetothienone. As a medium for the reaction, aromatic solvents such as those hereinbefore mentioned are advantageously used since they are good solvents both for the reactants and for the sodium salt of thenoyltrifluoroacetone which is formed. Benzene is preferably used as the medium. Paraffinic hydrocarbons, such as pentane or hexane, are solvents for the reactants but cause precipitation of the sodium salt of thenoyltrifluoroacetone which is formed. They may be employed when such result is desired.

The reaction for formation of the thenoyltrifluoroacetone sodium salt is usually carried out by adding, to the aforementioned benzene solution of sodium ethyl-methyl-ortho-trifluoroacetate, slightly less than the stoichiometric amount of acetothienone. The mixture is usually heated, e. g. under reflux, at reaction temperatures between 40° C. and the boiling temperature of the mixture at atmospheric pressure. However, the reaction can be carried out at higher temperatures, e. g. at temperatures as high as 150° C. or above by heating the mixture under pressure in a bomb or autoclave. The reaction is usually complete after from 2 to 5 hours of heating at temperatures in the range of from 40° to 80° C. and it may be accomplished in shorter time at higher temperatures.

For obtainance of thenoyltrifluoroacetone in good yield and readily purifiable form it is important that the sodium salt thereof be neutralized or acidified under conditions which permit rapid and substantially complete reaction and which avoid appreciable occurrence of a hydrolysis reaction. It is desirable that the salt of thenoyltrifluoroacetone be dissolved in a liquid solvent, e. g. water or preferably an organic solvent, at the time when it is treated with the acid, since penetration of acid through the solid salt in uncertain and may not be complete. When prepared in the preferred manned described above, the salt is obtained directly as a benzene solution thereof suitable for acidification. When obtained otherwise and in a solid form, it is preferably dissolved in an inert organic solvent, such as benzene, toluene, xylene, or ethylbenzene, etc. prior to being acidified.

The solution of the salt of thenoyltrifluoroacetone in an organic solvent may be acidified, with little or no hydrolysis of the product, by treating the solution with the stoichiometric amount or more of an acid while maintaining the mixture at temperatures not higher than 60° C. or thereabout, which temperatures are below 15° C., and usually between −10° and 5° C. when the mixture contains water in an appreciable amount, e. g. in an amount corresponding to 2 per cent or more of the weight of thenoyltrifluoroacetone present as such or as a salt thereof. The temperature is preferably such as to avoid freezing or crystallization of any considerable portion of the mixture. During acidification by adding an aqueous acid solution, it is important that the mixture be maintained at temperatures below 15° C., since otherwise a considerable portion of the thenoyltrifluoroacetone is destroyed by hydrolysis. However, after adding acid in amount sufficient to bring the mixture to a pH value below 8, and preferably to 7 or lower, as determined electrometrically using glass electrodes, the mixture may be permitted to warm, e. g. to temperatures as high as 60° C., without appreciable loss of the product by hydrolysis. It is only in the presence of water and at pH values in the order of from 8 to 9, that the product undergoes hydrolysis at a rapid rate. The acid may be added in as large a proportion as desired, but is preferably added in amount not greatly exceeding that necessary to render the mixture acidic.

Thenoyltrifluoroacetone has an ionization constant of approximately $6.7 \times 10^{-7}$. Acids suitable for use in acidification of the salt of thenoyltrifluoroacetone to liberate the latter in free form are those more strongly acidic than the thenoyltrifluoroacetone and having little or no oxidizing action at the temperatures employed. Examples of suitable acids are hydrochloric, hydrobromic, sulphuric, and phosphoric acids, etc.

The acidification is preferably accomplished under substantially anhydrous conditions so as to avoid possible loss of a portion of the product by hydrolysis. A substantially anhydrous acid of the kinds just mentioned, e. g. gaseous anhydrous HCl or HBr, or concentrated or anhydrous $H_2SO_4$ or $H_3PO_4$, etc., is fed to the solution of the thenoyltrifluoroacetone in benzene or other inert organic solvent in amount as great as the chemical equivalent of said salt and preferably in amount sufficient to render the mixture definitely acidic. The acid may be added in as large an excess as desired, but is preferably added in amount such as to render the mixture only slightly acidic. During addition of the acid, the mixture is stirred and maintained at temperatures not higher than 60° C., and usually between 15° and 30° C., since at higher acidification temperatures the product apparently undergoes decomposition to an appreciable extent and subsequent purification of the same is rendered more difficult.

During acidification under anhydrous conditions, the inorganic salt product, e. g. NaCl or $Na_2SO_4$, etc., usually is precipitated, leaving the thenoyltrifluoroacetone in solution. The salt may be removed by filtration or decanting and the liquid be distilled to remove the solvent and obtain thenoyltrifluoroacetone of good quality. However, the product sometimes retains a minor amount of the inorganic salt formed during the acidification.

The inorganic salt formed in the acidification step is preferably washed from the product with water. For instance, the organic layer of the mixture obtained by acidifying a benzene solution of the thenoyltrifluoroacetone sodium salt with aqueous acid at low temperature is separated and washed with water, or the benzene solution of thenoyltrifluoroacetone obtained by acidification under anhydrous conditions is washed directly with water, to remove excess acid and the inorganic salt from the product. Thereafter, the organic solution is subjected to distillation to recover the solvent and separate the thenoyltrifluoroacetone product. When such solvent is of lower boiling point than thenoyltrifluoroacetone, it may be distilled off to obtain thenoyltrifluoroacetone of good purity as a residue. If necessary, the thenoyltrifluoroacetone may be further purified by fractional distillation.

The method, as just described, permits ready and economical production of thenoyltrifluoroacetone of 95 per cent purity or higher, in yields exceeding 90 per cent, and usually greater than 95 per cent, of theoretical.

The following examples describe ways in which the invention has been practiced, and illustrate certain of its advantages, but are not to be construed as limiting its scope.

Example 1

Approximately 183 grams (3.22 mols) of powdered sodium methylate of 95 per cent purity was added with stirring to 1.5 liters of benzene. Thereafter, 438 grams (3.08 mols) of ethyl trifluoroacetate was added rapidly and with stirring. This caused spontaneous warming and within a few minutes the mixture became a clear solution. Approximately 378 grams (3 mols) of acetothienone was added rapidly with continued stirring. Thereupon, the mixture heated spontaneously to the boiling temperature and was permitted to reflux until the temperature subsided. Stirring was stopped and the resultant light amber solution of the sodium salt of thenoyltrifluoroacetone was permitted to stand overnight. The solution was then poured, with stirring into a mixture of 2 liters of water, 1 kilogram of cracked ice and 304 milliliters (3.65 mols) of aqueous hydrochloric acid of 37 per cent concentration. During mixing, a portion of the benzene froze, but soon thawed. The benzene layer of the mixture was separated, washed with 500 ml. of water and the benzene was removed by distillation on a steam bath at a final pressure of 50 mm., absolute. As the residue, there was obtained 654.8 grams, or a 98.4 per cent yield, of thenoyltrifluoroacetone of 95.6 per cent purity. The purity was determined by dissolving a weighed portion of the thenoyltrifluoroacetone in a measured amount of a 0.1 normal aqueous sodium hydroxide solution and back-titrating to a pH value of 9.2 with a 0.1 normal aqueous hydrochloric acid solution. Pure thenoyltrifluoroacetone has a freezing point of approximately 43.8° C.

Example 2

A benzene solution of the sodium salt of thenoyltrifluoroacetone was prepared using 500 ml. of benzene, 61 grams (1.08 mols) of sodium methylate of 95 per cent purity, 146 grams (1.03 mols) of ethyl trifluoroacetate and 126 grams (1.00 mol) of acetothienone. Except for the amounts of starting materials used, the procedure in forming the solution was similar to that described in Example 1. Gaseous hydrogen chloride was passed into the solution, while at about 20° C., until the mixture was saturated therewith. During introduction of the hydrogen chloride, sodium chloride was formed and precipitated. This was removed by filtration, washed with benzene and the washings were added to the filtrate. Benzene was distilled under vacuum from the combined filtrate and washings, as in Example 1. There was obtained, as the residue, 186.5 grams, i. e. an 84 per cent yield, of thenoyltrifluoroacetone of 96.5 per cent purity.

Example 3

A benzene solution of the sodium salt of thenoyltrifluoroacetone was prepared as in Example 1. Gaseous hydrogen chloride was passed into the solution, while stirring and maintaining the same at about 20° C., until the mixture was acid to moist litmus paper. The mixture was then agitated together with 1 liter of ice water and the layers of the mixtures were separated. The aqueous layer was extracted with benzene and the extract added to the organic layer. The latter was again washed with water, after which benzene was distilled therefrom as in Example 1. The residue consisted of 650 grams, or a 97.6 per cent yield, of thenoyltrifluoroacetone of 98.7 per cent purity.

Example 4

Approximately 12.5 grams (0.54 mol) of finely divided sodium was dissolved with stirring in 39.4 grams (1.23 mols) of absolute methanol. The resultant sodium methylate solution was diluted with 300 ml. of benzene. The solution was stirred and 73.2 grams (0.515 mol) of ethyl trifluoroacetate was added. The mixture changed to a clear solution within a few minutes. To the solution 62 grams (0.492 mol) of acetothienone was added with stirring. The solution was allowed to stand overnight. Anhydrous hydrogen chloride was passed into the resultant light orange colored solution, while maintaining the latter at temperatures of from 20° to 30° C., until the mixture was acidic to moist litmus paper. The mixture was agitated together with 300 ml. of water, after which the organic layer was separated and heated, ultimately to 100° C. at 50 mm. absolute pressure, to distill the benzene and alcohol therefrom. As the residue, there was obtained 104 grams of thenoyltrifluoroacetone of 92 per cent purity.

Example 5

Approximately 73.2 grams (0.515 mol) of ethyl trifluoroacetate was added with stirring to a solution, in 300 ml. of benzene, of 29.3 grams (0.515 mol) of sodium methylate of 95 per cent purity. The solution became clear when the addition was complete. Sixty-two (0.492 mol) of acetothienone was added with stirring, and the resultant solution was permitted to stand overnight. Approximately 27.6 grams of sulphuric acid of 96 per cent concentration was added dropwise over a period of 20 minutes while stirring and cooling the reaction mixture in a bath of ice water. The mixture was then agitated together with 200 ml. of water and the organic layer was separated. Benzene and alcohol were distilled from the organic layer by heating the latter ultimately to 100° C. at 50 mm. absolute pressure. As the residue, there was obtained 106.3 grams of thenoyltrifluoroacetone of 95 per cent purity.

Example 6

The experiment of Example 5 was repeated, except that the acid used to liberate thenoyltrifluoroacetone from its sodium salt consisted of 63 grams of phosphoric acid of 85 per cent concentration. There was obtained 107.3 grams of thenoyltrifluoroacetone of 94.8 per cent purity.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A method for making thenoyltrifluoroacetone which comprises reacting together acetothienone and more than its molecular equivalent of an alkali metal salt of an orthotrifluoroacetate in an inert organic liquid medium to form an alkali metal salt of thenoyltrifluoroacetone and acidifying the latter at temperatures which are not higher than 60° C. and are below 15° C. when water is present in the mixture, to liberate thenoyltrifluoroacetone from the salt thereof.

2. A method for making thenoyltrifluoroacetone which comprises reacting together acetothienone and more than its molecular equivalent of an alkali metal salt of an orthotrifluoroacetate at temperatures between 40° and 80° C. while dissolved in an inert organic liquid which is a solvent for the salt of thenoyltrifluoroacetone which is formed, thereafter acidifying the mixture at temperatures which are below 60° C. and are below 15° C. when water is present therein, and separating thenoyltrifluoroacetone from the resultant mixture.

3. A method, as described in claim 2, wherein the inert organic liquid is one having a boiling point below that of thenoyltrifluoroacetone.

4. A method, as described in claim 2, herein the alkali metal salt of an ortho-trifluoroacetate is a sodium dialkyl-ortho-trifluoroacetate.

5. A method, as described in claim 2, wherein the acidification is accomplished by adding a substantially anhydrous acid to the solution of the salt of thenoyltrifluoroacetone and an organic solvent while maintaining the mixture at temperatures below 60° C.

6. A method, as claimed in claim 5, wherein the acid is a gaseous hydrogen halide and it is added in amount not greatly exceeding that necessary for acidification of the mixture.

7. A method, as described in claim 2, wherein the acidification is accomplished by adding an aqueous acid solution to the solution of the salt of thenoyltrifluoroacetone and an organic solvent while cooling the mixture to maintain it at temperatures below 15° C.

8. A method, as described in claim 2, wherein the acidification is accomplished by adding an aqueous hydrohalic acid solution to the solution of the salt of thenoyltrifluoroacetone and an organic solvent, the acid solution being added in amount slightly exceeding that necessary to acidify the mixture, and cooling the mixture to maintain it at temperatures between about −10° C. and 5° C. during addition of the acid.

9. A method, as claimed in claim 8, wherein the hydrohalic acid is hydrochloric acid.

10. In a method for making thenoyltrifluoroacetone, the steps of forming a solution of acetothienone and more than its molecular equivalent of a sodium dialkyl-ortho-trifluoroacetate in benzene, and reacting together the acetothienone and sodium dialkyl-ortho-trifluoroacetate by bringing the solution to temperatures between 40° and 80° C.

11. In a method for making thenoyltrifluoroacetone, the step of acidifying a solution of an alkali metal salt of thenoyltrifluoroacetone and an inert organic solvent by adding a substantially anhydrous acid while maintaining the mixture at temperatures below 60° C.

12. In a method for making thenoyltrifluoroacetone, the step of acidifying a solution of the sodium salt of thenoyltrifluoroacetone and an inert organic solvent by passing a gaseous hydrogen halide into the solution under substantially anhydrous conditions, while maintaining the mixture at temperatures below 60° C., until the mixture has an acid reaction to moist litmus paper.

13. In a method for making thenoyltrifluoroacetone, the steps of passing gaseous hydrogen chloride into a substantially anhydrous solution of the sodium salt of thenoyltrifluoroacetone and benzene until the mixture has an acid reaction to moist litmus paper, thereafter washing the mixture with water to remove sodium chloride therefrom, and distilling benzene from the mixture to obtain a residue of thenoyltrifluoroacetone.

14. In a method for making thenoyltrifluoroacetone, the steps of acidifying a solution of an alkali metal salt of thenoyltrifluoroacetone and an inert organic solvent by adding thereto an aqueous acid solution while cooling the mixture to maintain it at temperatures below 15° C., separating the aqueous and organic layers of the resultant mixture, washing the organic layer with water, and separating thenoyltrifluoroacetone from the organic layer by distillation.

15. In a method for making thenoyltrifluoroacetone, the steps of adding aqueous hydrochloric acid to a benzene solution of the sodium salt of thenoyltrifluoroacetone, while cooling the mixture to maintain it at temperatures between about −10° and 5° C., until the mixture as a whole is slightly acidic, separating the aqueous and organic layers of the resultant mixture, washing the organic layer with water, and distilling benzene from the organic layer to obtain a residue of thenoyltrifluoroacetone.

16. A method for making thenoyltrifluoroacetone which comprises reacting together acetothienone and more than its molecular equivalent of an alkali metal salt of sodium ethyl-methyl-ortho-trifluoroacetate at temperatures between 40° and 80° C. while dissolved in benzene, thereafter acidifying the mixture at temperatures which are below 60° C. and are below 15° C. when water is present in the mixture, and separating thenoyltrifluoroacetone from the resultant mixture.

References Cited in the file of this patent

Reid, J. C. and Calvin M.; U. S. Atomic Energy Comm., Oak Ridge, Tenn., MDDC–1405 (BC–75) of August 13, 1947, declassified October 24, 1947.